(12) United States Patent
Naito

(10) Patent No.: US 11,977,413 B2
(45) Date of Patent: May 7, 2024

(54) DISPLAY DEVICE

(71) Applicant: JOLED INC., Tokyo (JP)

(72) Inventor: Nobuo Naito, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 17/823,151

(22) Filed: Aug. 30, 2022

(65) Prior Publication Data

US 2023/0068260 A1    Mar. 2, 2023

(51) Int. Cl.
*G06F 1/16* (2006.01)

(52) U.S. Cl.
CPC .................. *G06F 1/1652* (2013.01)

(58) Field of Classification Search
CPC .................................................. G06F 1/1652
See application file for complete search history.

(56) References Cited

U.S. PATENT DOCUMENTS

| | | | |
|---|---|---|---|
| 10,485,116 B2 * | 11/2019 | Kim | G06F 1/1641 |
| 10,798,831 B2 * | 10/2020 | Shin | H05K 3/284 |
| 11,487,327 B2 * | 11/2022 | Horiuchi | G06F 1/1641 |
| 2016/0357052 A1 * | 12/2016 | Kim | H10K 50/84 |
| 2017/0352692 A1 | 12/2017 | Lee et al. | |
| 2018/0097197 A1 | 4/2018 | Han et al. | |
| 2018/0153049 A1 | 5/2018 | Song et al. | |
| 2018/0190936 A1 * | 7/2018 | Lee | B32B 3/18 |
| 2019/0036068 A1 | 1/2019 | Kim et al. | |
| 2019/0098774 A1 | 3/2019 | Park et al. | |
| 2019/0132947 A1 * | 5/2019 | Koo | G09F 9/301 |
| 2019/0196548 A1 * | 6/2019 | Kim | G09F 9/301 |
| 2019/0243424 A1 * | 8/2019 | Lee | G06F 1/1679 |
| 2021/0165454 A1 * | 6/2021 | Dong | G06F 1/1652 |
| 2021/0263563 A1 * | 8/2021 | Tsuchihashi | G06F 1/1652 |
| 2021/0360800 A1 * | 11/2021 | Horiuchi | G06F 1/1616 |
| 2022/0103670 A1 * | 3/2022 | Liao | H04M 1/0216 |
| 2022/0183174 A1 * | 6/2022 | Bae | G06F 1/1641 |
| 2022/0269310 A1 * | 8/2022 | Xiong | G06F 1/1652 |

FOREIGN PATENT DOCUMENTS

| | | |
|---|---|---|
| JP | 2017-219843 | 12/2017 |
| JP | 2019-28467 | 2/2019 |
| JP | 6594398 | 10/2019 |
| JP | 6898485 B1 | 7/2021 |

OTHER PUBLICATIONS

Office Action for Japanese Patent Application No. 2021-143542, dated May 9, 2023.

* cited by examiner

*Primary Examiner* — Sagar Shrestha
(74) *Attorney, Agent, or Firm* — CHIP LAW GROUP

(57) ABSTRACT

Provided is a display device including a display panel capable of being folded or rolled up, and a plate-shaped member placed on the display panel and capable of being folded or rolled up together with the display panel, the plate-shaped member including a bendable portion that is bent when the plate-shaped member is folded or rolled up together with the display panel, the bendable portion including a region group including a plurality of regions arranged in a bending direction along which the bendable portion is bent when the plate-shaped member is folded or rolled up together with the display panel, the bendable portion having openings with each of the regions having a plurality of through holes formed therein, an opening area ratio of the bendable portion in each of the regions being different from an opening area ratio of the bendable portion in an adjacent one of the regions.

5 Claims, 8 Drawing Sheets

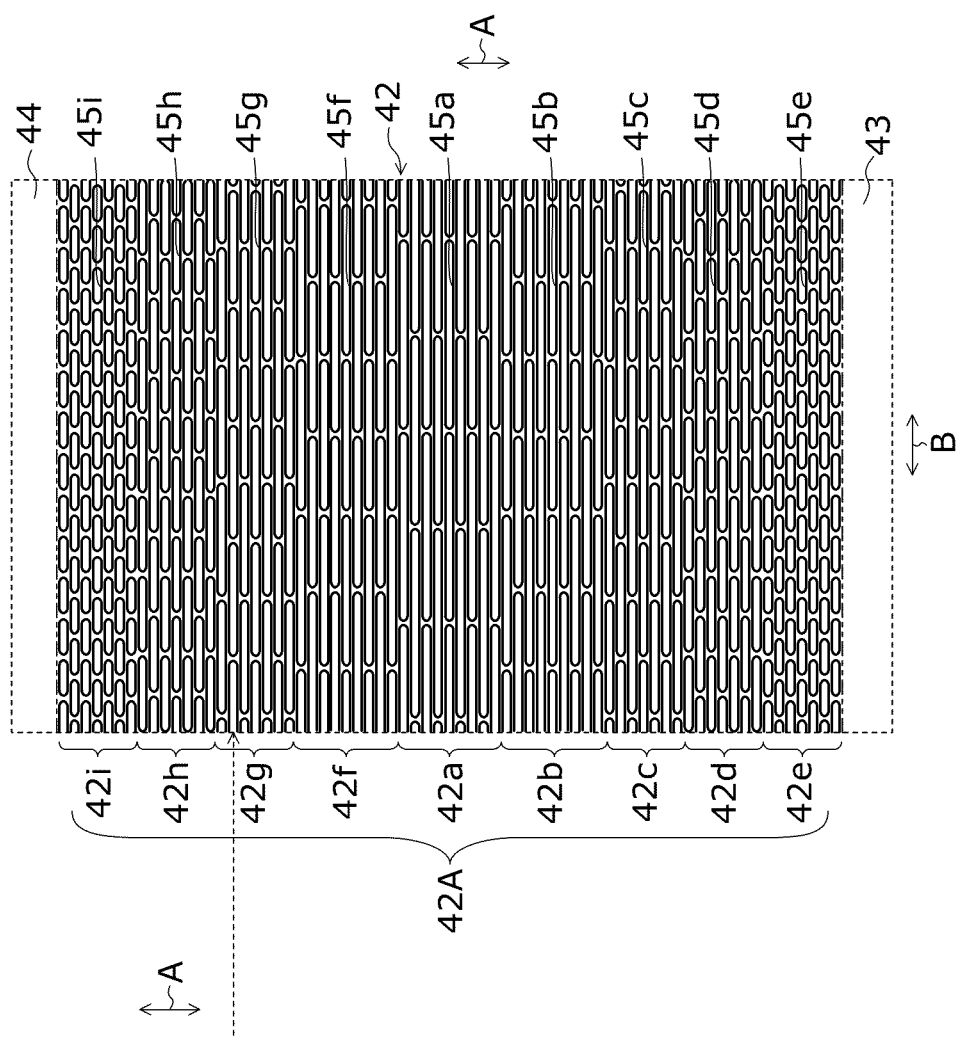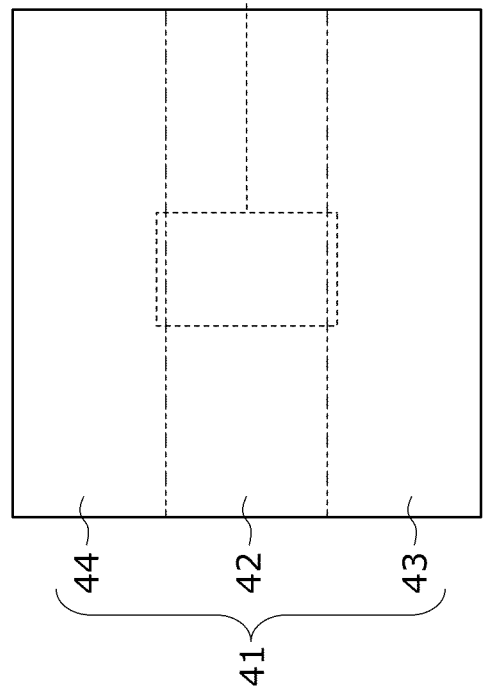

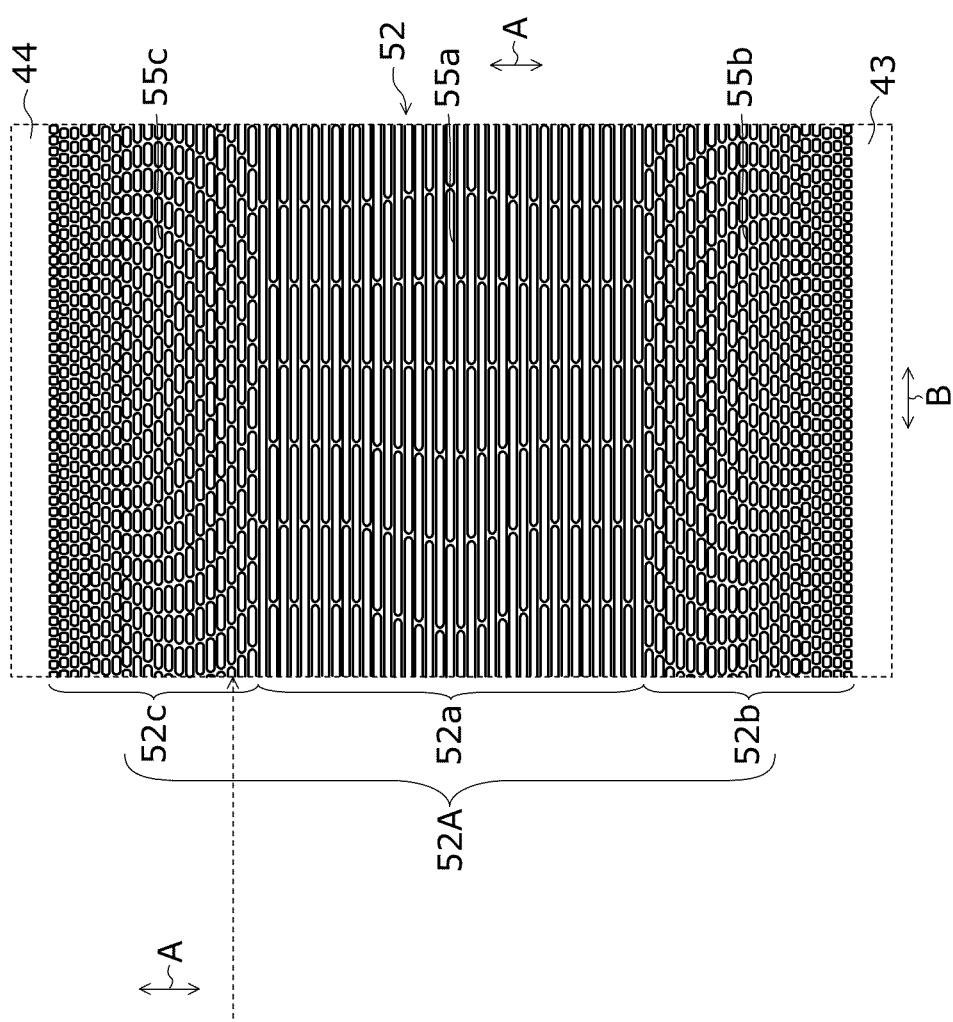
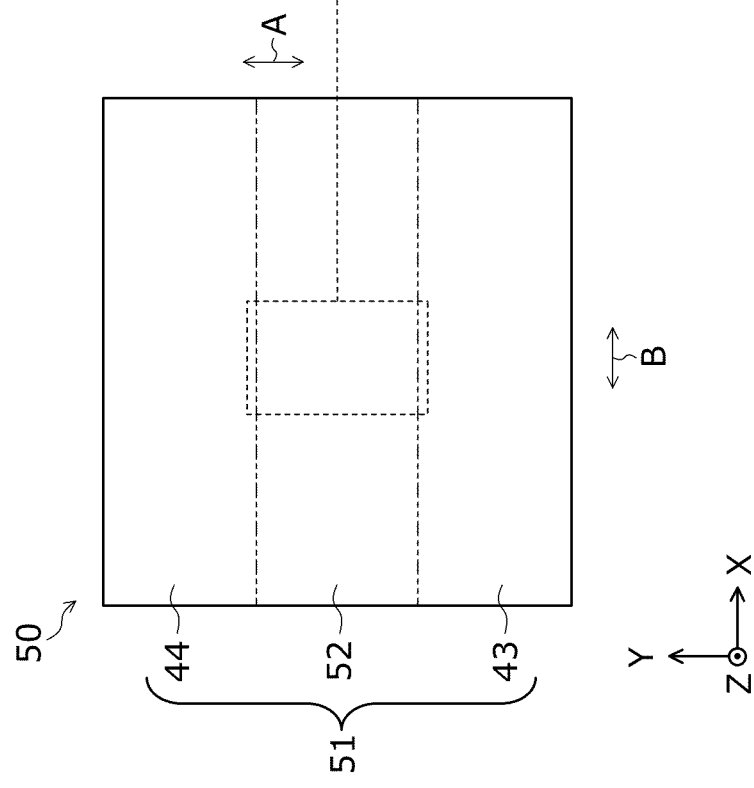

DISPLAY DEVICE

CROSS REFERENCE TO RELATED APPLICATIONS

The present disclosure contains subject matter related to that disclosed in Japanese Priority Patent Application JP 2021-143542 filed in the Japan Patent Office on Sep. 2, 2021, the entire content of which is hereby incorporated by reference.

BACKGROUND

The present disclosure relates to a display device, and, in particular, relates to a display device including a display panel having flexibility.

Display devices including a display panel having flexibility have been known. As an example of this type of display devices, a flexible display including a display panel having flexibility and a lower plate facing a lower surface of the display panel is described in Japanese Patent Laid-open No. 2019-28467. The lower plate is foldable, and a foldable region of the lower plate has a plurality of opening portions formed therein.

SUMMARY

However, the flexible display described in Japanese Patent Laid-open No. 2019-28467 has a problem in that the foldable region of the lower plate can be visually recognized through the display panel. For example, when an opening area ratio varies sharply in the vicinity of a boundary between a region in which a plurality of opening portions are formed and a region in which a plurality of opening portions are not formed, the region in which the plurality of opening portions are formed becomes visible from the display panel.

The present disclosure has been conceived of to overcome the above problem, and it is desirable to provide a display device that is able to reduce the likelihood that a bendable portion of a plate-shaped member will be visually recognized through a display panel.

A display device according to an embodiment of the present disclosure includes a display panel capable of being folded or rolled up, and a plate-shaped member placed on the display panel and capable of being folded or rolled up together with the display panel. The plate-shaped member includes a bendable portion that is bent when the plate-shaped member is folded or rolled up together with the display panel. The bendable portion includes a region group including a plurality of regions arranged in a bending direction along which the bendable portion is bent when the plate-shaped member is folded or rolled up together with the display panel, the bendable portion having openings with each of the plurality of regions having a plurality of through holes formed therein. An opening area ratio of the bendable portion in each of the plurality of regions is different from an opening area ratio of the bendable portion in an adjacent one of the plurality of regions.

The display device according to the above embodiment of the present disclosure is able to reduce the likelihood that the bendable portion of the plate-shaped member will be visually recognized through the display panel.

BRIEF DESCRIPTION OF THE DRAWINGS

FIG. 4A and FIG. 4B illustrate a reinforcing member of the display device illustrated in FIG. 1A and FIG. 1B;

FIG. 5A and FIG. 5B illustrate a reinforcing member of a display device according to a second embodiment of the present disclosure;

DETAILED DESCRIPTION OF THE PREFERRED EMBODIMENTS

Figure 1A:
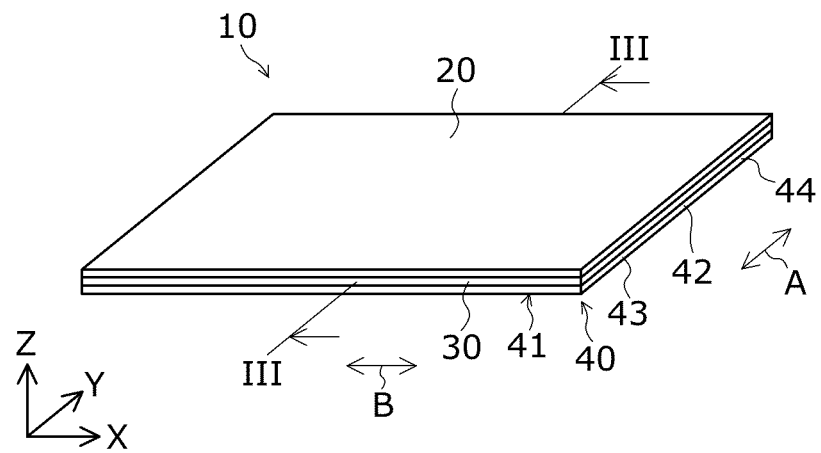
FIG. 1A and FIG. 1B represent perspective views of a display device according to a first embodiment of the present disclosure.

Hereinafter, display devices according to embodiments of the present disclosure will be described with reference to the accompanying drawings. It is to be appreciated that each of the embodiments described below represents a specific example of the present disclosure. Hence, numerical values, constituent elements, positions at which the constituent elements are disposed, forms of connection of the constituent elements, and other details disclosed in the following descriptions of the embodiments are mere examples, and should not be construed as limiting the present disclosure. Accordingly, constituent elements of the embodiments described below which are not recited in the independent claim will be described as optional constituent elements.

In the accompanying drawings, substantially identical constituent elements are denoted by identical reference characters. In addition, each of the accompanying drawings is a schematic diagram, and does not necessarily represent relative sizes of parts and other details in a precise manner.

First Embodiment

Figure 1B:
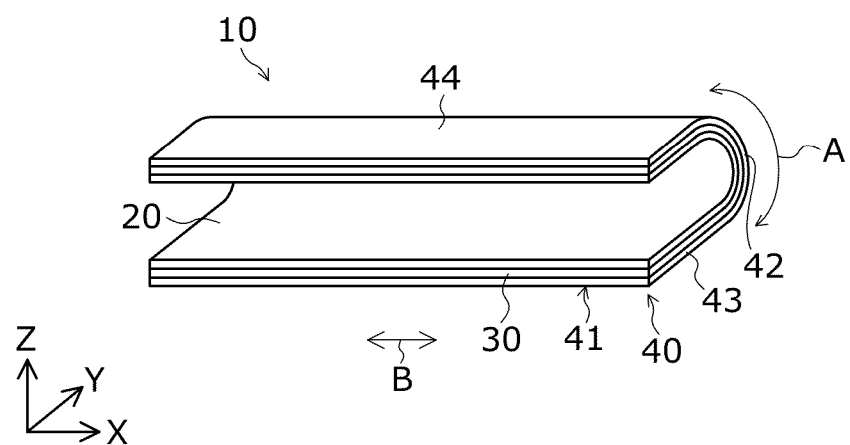
Figure 2:
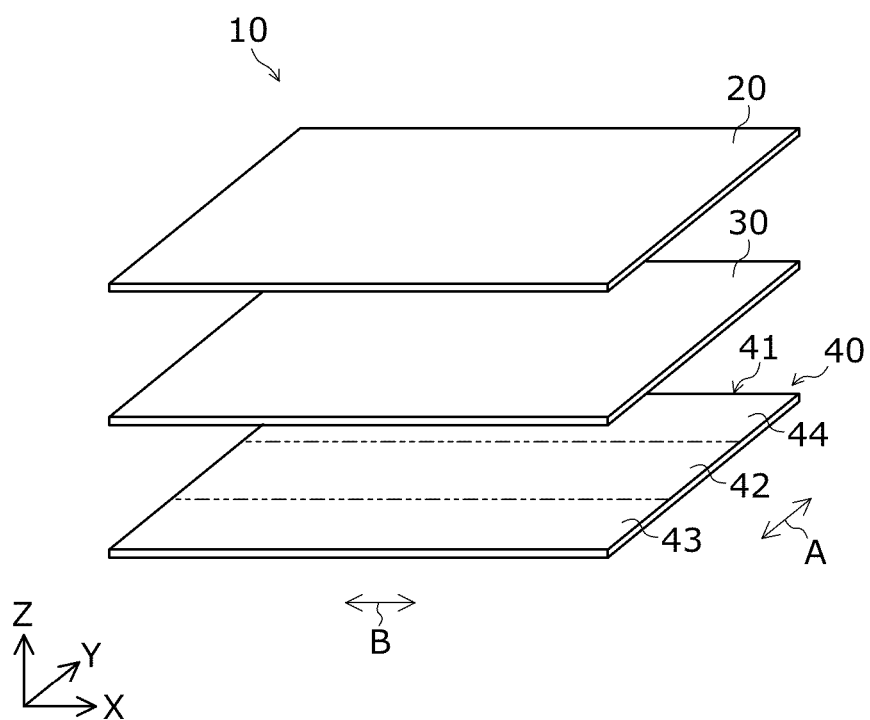
FIG. 2 is an exploded perspective view of the display device illustrated in FIG. 1A and FIG. 1B.
Figure 3:
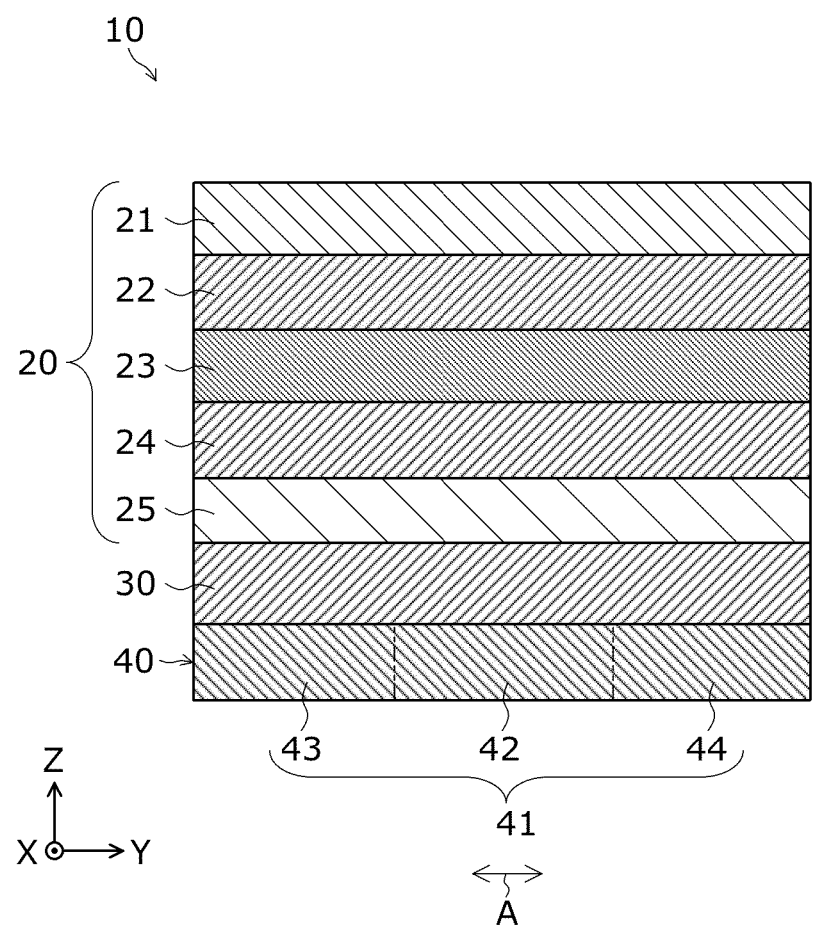
FIG. 3 is a sectional view of the display device illustrated in FIG. 1A and FIG. 1B.

FIG. 1A and FIG. 1B represent perspective views of a display device 10 according to a first embodiment of the present disclosure. Here, FIG. 1A illustrates the display device 10 in a state in which a display panel 20 and other components are spread out, while FIG. 1B illustrates the display device 10 in a state in which the display panel 20 and other components are folded. FIG. 2 is an exploded perspective view of the display device 10 illustrated in FIG. 1A and FIG. 1B. FIG. 3 is a sectional view of the display device 10 illustrated in FIG. 1A and FIG. 1B. More specifically, FIG. 3 is a sectional view of the display device 10 taken along line III-III in FIG. 1A. In FIGS. 2 and 3, a boundary between a bendable portion 42 and a first flat portion 43 and a boundary between the bendable portion 42 and a second flat portion 44 are represented by chain double-dashed lines. In addition, in FIGS. 2 and 3, a plurality of through holes formed in the bendable portion 42 are not illustrated. The display device 10 according to the first embodiment will be described below with reference to FIGS. 1A, 1B, 2, and 3.

As illustrated in FIGS. 1A, 1B, and 2, the display device 10 is a device that displays an image, and includes the display panel 20, an optical adhesive sheet 30, and a reinforcing member 40. The display device 10 is a foldable display device, and the display panel 20, the optical adhesive sheet 30, and the reinforcing member 40 can be folded, while the display panel 20 and other components in a folded state can be spread out. The display device 10 is used in, for example, a tablet terminal, a digital television, digital signage, a smart phone, a wearable terminal, or other equipment.

The display panel 20 is a display panel capable of being folded. The display panel 20 has flexibility, and is what is generally called a flexible display panel. The display panel 20 displays an image. For example, the display panel 20 is connected to a driving board (not illustrated) through a flexible board (not illustrated), and is driven by the driving board to display an image.

The display panel 20 is a plate-shaped member that extends in a first direction and a second direction perpendicular to the first direction and has a thickness direction parallel to a third direction perpendicular to both the first direction and the second direction, in a spread-out state, and displays an image toward one side in the third direction (i.e., a positive side in a Z-axis direction). In the spread-out state, the display panel 20 is rectangular when viewed in the third direction. The first direction is a direction represented by an X-axis in FIG. 1A and other drawings, the second direction is a direction represented by a Y-axis in FIG. 1A and other drawings, and the third direction is a direction represented by a Z-axis in FIG. 1A and other drawings. Note that the display panel 20 may not be rectangular and may alternatively be in the shape of another polygon, circular, or elliptical, for example, in the spread-out state.

The display panel 20 is folded about the first direction. That is, the display panel 20 is bent about the first direction in a folded state. In the present embodiment, the display panel 20 is folded such that the optical adhesive sheet 30 and the reinforcing member 40 are positioned outward of the display panel 20.

As illustrated in FIG. 3, the display panel 20 includes a cover window 21, an optical adhesive sheet 22, a circularly polarizing plate 23, an optical adhesive sheet 24, and an organic light emitting diode (OLED) panel 25.

The cover window 21, the optical adhesive sheet 22, the circularly polarizing plate 23, the optical adhesive sheet 24, and the OLED panel 25 are stacked in the order named, in the thickness direction of the display panel 20. The thickness direction of the display panel 20 coincides with a thickness direction of the optical adhesive sheet 30 and a thickness direction of the reinforcing member 40.

The cover window 21 is adhered to the circularly polarizing plate 23 with the optical adhesive sheet 22 intervening therebetween, and the circularly polarizing plate 23 is adhered to the OLED panel 25 with the optical adhesive sheet 24 intervening therebetween. The OLED panel 25, for example, has a stack of layers of thin film transistors (TFTs), OLEDs having organic electroluminescence (EL) elements, and thin film encapsulation (TFE).

As illustrated in FIGS. 1A, 1B, 2, and 3, the optical adhesive sheet 30 is stuck to a rear surface of the display panel 20 on a side opposite to a display screen thereof which displays an image, and is thus placed on the display panel 20. In the present embodiment, the optical adhesive sheet 30 is stuck to the whole rear surface of the display panel 20. In the present embodiment, the rear surface of the display panel 20 is a rear surface of the OLED panel 25. For example, an acrylic, silicone, epoxy, or rubber adhesive can be used as the optical adhesive sheet 30.

The reinforcing member 40 is a member for reinforcing the display panel 20. The reinforcing member 40 includes a plate-shaped member 41.

The plate-shaped member 41 is a plate-shaped member placed on the display panel 20 and capable of being folded together with the display panel 20. The plate-shaped member 41 is placed on a rear side of the display panel 20. The plate-shaped member 41 has higher rigidity than the display panel 20. The plate-shaped member 41 is adhered to the display panel 20 with the optical adhesive sheet 30 intervening therebetween.

The plate-shaped member 41 is a plate-shaped member that extends in the first direction and the second direction and has a thickness direction parallel to the third direction in a spread-out state. In the spread-out state, the plate-shaped member 41 is rectangular when viewed in the third direction. Note that the plate-shaped member 41 may not be rectangular and may alternatively be in the shape of another polygon, circular, or elliptical, for example, in the spread-out state. The plate-shaped member 41 is made of, for example, metal having a large elastic region, such as stainless steel (SUS) 301, or other materials.

The plate-shaped member 41 includes the bendable portion 42, the first flat portion 43, and the second flat portion 44.

The bendable portion 42 is a bendable portion that is bent when the plate-shaped member 41 is folded together with the display panel 20. The bendable portion 42 is plate-shaped and has a thickness direction parallel to the third direction when the plate-shaped member 41 is in the spread-out state.

A bending direction A along which the bendable portion 42 is bent when the plate-shaped member 41 is folded together with the display panel 20 is parallel to principal surfaces of the plate-shaped member 41, coincides with the second direction when the plate-shaped member 41 is in the spread-out state, and is bent about the first direction when the plate-shaped member 41, together with the display panel 20, is in a folded state. A perpendicular direction B, which is perpendicular to the bending direction A, is parallel to the principal surfaces of the plate-shaped member 41, is perpendicular to the thickness direction of the plate-shaped member 41, and coincides with the first direction.

In the present embodiment, the bendable portion 42 is positioned in a middle of the plate-shaped member 41 in the bending direction A, and extends from one end to another end of the plate-shaped member 41 in the perpendicular direction B. As will be described in detail below, the bendable portion 42 has a plurality of through holes formed therein, and owing to the through holes formed therein, the bendable portion 42 is capable of being bent to such an extent that the plate-shaped member 41 can be folded. That is, each of the through holes formed in the bendable portion 42 is a through hole for enabling the plate-shaped member 41 to be folded at the bendable portion 42.

The first flat portion 43 is connected to an end portion of the bendable portion 42 at one end (hereinafter referred to as a first end) in the bending direction A, and is formed integrally with the bendable portion 42. The first flat portion 43 is plate-shaped and has a thickness direction parallel to the third direction when the plate-shaped member 41 is in the spread-out state. The first flat portion 43 does not have a plurality of through holes formed therein, and the first flat portion 43 has a rigidity higher than that of the display panel 20. The first flat portion 43 is placed on a portion of the display panel 20 which lies on a first side of a middle portion of the display panel 20 in the bending direction A, and is adhered to this portion with the optical adhesive sheet 30 intervening therebetween. This contributes to minimizing a reduction in flatness of this portion of the display panel 20.

The second flat portion 44 is connected to an end portion of the bendable portion 42 at an opposite end (hereinafter referred to as a second end) in the bending direction A, and is formed integrally with the bendable portion 42. The second flat portion 44 is plate-shaped and has a thickness direction parallel to the third direction when the plate-shaped member 41 is in the spread-out state. The second flat portion 44 does not have a plurality of through holes formed therein, and the second flat portion 44 has a rigidity higher than that of the display panel 20. The second flat portion 44 is placed on a portion of the display panel 20 which lies on a second side of the middle portion of the display panel 20 in the bending direction A, and is adhered to this portion with the optical adhesive sheet 30 intervening therebetween. This contributes to minimizing a reduction in flatness of this portion of the display panel 20.

FIG. 4A and FIG. 4B illustrate the reinforcing member 40 of the display device 10 illustrated in FIG. 1A and FIG. 1B. Here, FIG. 4B represents an enlarged view of a portion enclosed by a dashed line in FIG. 4A. In FIG. 4A, the boundary between the bendable portion 42 and the first flat portion 43 and the boundary between the bendable portion 42 and the second flat portion 44 are represented by chain double-dashed lines. In addition, in FIG. 4A, the through holes formed in the bendable portion 42 are not illustrated. The reinforcing member 40 will be described in detail below with reference to FIG. 4A and FIG. 4B.

As illustrated in FIG. 4B, the bendable portion 42 includes a region group 42A including a plurality of regions 42a, 42b, 42c, 42d, 42e, 42f, 42g, 42h, and 42i arranged in the bending direction A. Each of the regions 42a to 42i extends from one end to another end of the bendable portion 42 in the perpendicular direction B.

The regions 42a to 42i include a middle region positioned in a middle of the bendable portion 42 in the bending direction A, a first end region positioned at the first end of the bendable portion 42 in the bending direction A, and a second end region positioned at the second end of the bendable portion 42 in the bending direction A. In the present embodiment, the region 42a corresponds to the middle region, the region 42e corresponds to the first end region, and the region 42i corresponds to the second end region.

In addition, in the present embodiment, the regions 42a to 42i include one or more regions positioned between the middle region and the first end region and one or more regions positioned between the middle region and the second end region. In the present embodiment, the one or more regions positioned between the middle region and the first end region correspond to the three regions 42b, 42c, and 42d, while the one or more regions positioned between the middle region and the second end region correspond to the three regions 42f, 42g, and 42h.

The three regions 42b, 42c, and 42d are arranged in the order named, in a direction leading from the region 42a to the region 42e. The three regions 42f, 42g, and 42h are arranged in the order named, in a direction leading from the region 42a to the region 42i.

The reinforcing member 40 has a plurality of through holes formed in each of the regions 42a to 42i. More specifically, the reinforcing member 40 has a plurality of through holes 45a formed in the region 42a, a plurality of through holes 45b formed in the region 42b, a plurality of through holes 45c formed in the region 42c, a plurality of through holes 45d formed in the region 42d, a plurality of through holes 45e formed in the region 42e, a plurality of through holes 45f formed in the region 42f, a plurality of through holes 45g formed in the region 42g, a plurality of through holes 45h formed in the region 42h, and a plurality of through holes 45i formed in the region 42i. The through holes formed in each of the regions 42a to 42i are formed, for example, through wet etching or other methods.

Each of the through holes formed in each of the regions 42a to 42i passes through the bendable portion 42 in the thickness direction of the bendable portion 42. That is, each of the through holes 45a, each of the through holes 45b, each of the through holes 45c, each of the through holes 45d, each of the through holes 45e, each of the through holes 45f, each of the through holes 45g, each of the through holes 45h, and each of the through holes 45i pass through the bendable portion 42 in the thickness direction of the bendable portion 42.

The bendable portion 42 has openings with each of the regions 42a to 42i having a plurality of through holes formed therein. In other words, each of the through holes formed in each of the regions 42a to 42i passes through the bendable portion 42, thereby forming an opening in the bendable portion 42. When the plate-shaped member 41 in the spread-out state is viewed in the thickness direction, for example, the bendable portion 42 has openings at the through holes 45a, the through holes 45b, the through holes 45c, the through holes 45d, the through holes 45e, the through holes 45f, the through holes 45g, the through holes 45h, and the through holes 45i.

An opening area ratio of the bendable portion 42 in each of the regions 42a to 42i is different from an opening area ratio of the bendable portion 42 in an adjacent one(s) of the regions 42a to 42i. More specifically, for example, the opening area ratio of the bendable portion 42 in the region 42a is different from the opening area ratio of the bendable portion 42 in the region 42b, which is adjacent to the region 42a, and is different from the opening area ratio of the bendable portion 42 in the region 42f, which is adjacent to the region 42a. In addition, for example, the opening area ratio of the bendable portion 42 in the region 42c is different from the opening area ratio of the bendable portion 42 in the region 42b, which is adjacent to the region 42c, and is different from the opening area ratio of the bendable portion 42 in the region 42d, which is adjacent to the region 42c. In addition, for example, the opening area ratio of the bendable portion 42 in the region 42e is different from the opening area ratio of the bendable portion 42 in the region 42d, which is adjacent to the region 42e.

The opening area ratio of the bendable portion 42 in the first end region and the opening area ratio of the bendable portion 42 in the second end region are smaller than the opening area ratio of the bendable portion 42 in the middle region. That is, the opening area ratio of the bendable portion 42 in the region 42e and the opening area ratio of the bendable portion 42 in the region 42i are smaller than the opening area ratio of the bendable portion 42 in the region 42a.

For example, the opening area ratio of the bendable portion 42 in each of the regions 42a to 42i refers to the ratio of the combined area of through holes formed in a unit region of that region to the area of the unit region when the plate-shaped member 41 in the spread-out state is viewed in the thickness direction. Specifically, for example, the opening area ratio of the bendable portion 42 in the region 42a refers to the ratio of the combined area of the through holes 45a formed in a unit region of the region 42a to the area of the unit region when the plate-shaped member 41 in the spread-out state is viewed in the thickness direction. More specifically, for example, the opening area ratio of the bendable portion 42 in the region 42a is given by (the combined area of the through holes 45a formed in the unit region of the region 42a)÷(the area of the unit region) when the plate-shaped member 41 in the spread-out state is viewed in thickness direction.

The opening area ratio of the bendable portion 42 in the regions 42a to 42i decreases from the middle region toward the first end region, and decreases from the middle region toward the second end region. That is, the bendable portion 42 has the highest opening area ratio in the region 42a, and has increasingly lower opening area ratios in the region 42b, the region 42c, the region 42d, and the region 42e in the order named, and also has increasingly lower opening area ratios in the region 42f, the region 42g, the region 42h, and the region 42i in the order named.

The dimension of each of the through holes formed in the first end region in the perpendicular direction B and the dimension of each of the through holes formed in the second end region in the perpendicular direction B are smaller than the dimension of each of the through holes formed in the middle region in the perpendicular direction B. That is, the dimension of each of the through holes 45e formed in the region 42e in the perpendicular direction B and the dimension of each of the through holes 45i formed in the region 42i in the perpendicular direction B are smaller than the dimension of each of the through holes 45a formed in the region 42a in the perpendicular direction B.

The dimension of each of the through holes formed in the regions 42a to 42i in the perpendicular direction B decreases from the middle region toward the first end region, and decreases from the middle region toward the second end region. That is, the dimension of each of the through holes 45a formed in the region 42a in the perpendicular direction B is the greatest, followed by the dimension of each of the through holes 45b formed in the region 42b in the perpendicular direction B, the dimension of each of the through holes 45c formed in the region 42c in the perpendicular direction B, the dimension of each of the through holes 45d formed in the region 42d in the perpendicular direction B, and the dimension of each of the through holes 45e formed in the region 42e in the perpendicular direction B in the order named. In addition, the dimension of each of the through holes 45a formed in the region 42a in the perpendicular direction B is the greatest, followed by the dimension of each of the through holes 45f formed in the region 42f in the perpendicular direction B, the dimension of each of the through holes 45g formed in the region 42g in the perpendicular direction B, the dimension of each of the through holes 45h formed in the region 42h in the perpendicular direction B, and the dimension of each of the through holes 45i formed in the region 42i in the perpendicular direction B in the order named.

The through holes formed in each of the regions 42a to 42i are arranged in both the bending direction A and the perpendicular direction B. In the present embodiment, the through holes formed in each of the regions 42a to 42i are arranged in a staggered configuration.

An interval between the through holes formed in one of two adjacent ones of the regions 42a to 42i and arranged in the perpendicular direction B is different from an interval between the through holes formed in another one of the two adjacent regions and arranged in the perpendicular direction B. The interval between the through holes arranged in the perpendicular direction B refers to, for example, the distance between a center in the perpendicular direction B of one of two through holes that are adjacent to each other in the perpendicular direction B and a center in the perpendicular direction B of another one of the two adjacent through holes.

For example, an interval between the through holes 45a formed in the region 42a, which is one of two adjacent regions 42a and 42b, and arranged in the perpendicular direction B is different from an interval between the through holes 45b formed in the other region 42b and arranged in the perpendicular direction B.

The interval between the through holes formed in the regions 42a to 42i and arranged in the perpendicular direction B decreases from the middle region toward the first end region, and decreases from the middle region toward the second end region. That is, the interval between the through holes 45a formed in the region 42a and arranged in the perpendicular direction B is the greatest, followed by the interval between the through holes 45b formed in the region 42b and arranged in the perpendicular direction B, the interval between the through holes 45c formed in the region 42c and arranged in the perpendicular direction B, the interval between the through holes 45d formed in the region 42d and arranged in the perpendicular direction B, and the interval between the through holes 45e formed in the region 42e and arranged in the perpendicular direction B in the order named. In addition, the interval between the through holes 45a formed in the region 42a and arranged in the perpendicular direction B is the greatest, followed by the interval between the through holes 45f formed in the region 42f and arranged in the perpendicular direction B, the interval between the through holes 45g formed in the region 42g and arranged in the perpendicular direction B, the interval between the through holes 45h formed in the region 42h and arranged in the perpendicular direction B, and the interval between the through holes 45i formed in the region 42i and arranged in the perpendicular direction B in the order named.

An interval between the through holes formed in one of two adjacent ones of the regions 42a to 42i and arranged in the bending direction A is equal to an interval between the through holes formed in another one of the two adjacent regions and arranged in the bending direction A. The interval between the through holes arranged in the bending direction A refers to, for example, the distance between a center in the bending direction A of one of two through holes that are adjacent to each other in the bending direction A and a center in the bending direction A of another one of the two adjacent through holes. In the present embodiment, the interval between the through holes formed in each of the regions 42a to 42i and arranged in the bending direction A is equal.

The display device 10 according to the first embodiment has been described above.

The display device 10 according to the first embodiment includes the display panel 20, which is capable of being folded, and the plate-shaped member 41, which is placed on the display panel 20 and is capable of being folded together with the display panel 20. The plate-shaped member 41 includes the bendable portion 42, which is bent when the plate-shaped member 41 is folded together with the display panel 20. The bendable portion 42 includes the region group 42A including the plurality of regions 42a to 42i arranged in the bending direction A along which the bendable portion 42 is bent when the plate-shaped member 41 is folded together with the display panel 20. The bendable portion 42 has openings with each of the plurality of regions 42a to 42i having the plurality of through holes formed therein. The opening area ratio of the bendable portion 42 in each of the plurality of regions 42a to 42i is different from the opening area ratio of the bendable portion 42 in an adjacent one of the plurality of regions 42a to 42i.

Thus, the opening area ratio of the bendable portion 42 in each of the plurality of regions 42a to 42i is different from the opening area ratio of the bendable portion 42 in an adjacent one of the plurality of regions 42a to 42i. This contributes to preventing portions of each of the plurality of regions 42a to 42i at which the plurality of through holes are not formed and portions of the adjacent one of the regions 42a to 42i at which the plurality of through holes are not formed from being aligned in the bending direction A, which, in turn, contributes to preventing the bendable portion 42 of the plate-shaped member 41 from being visually recognized through the display panel 20.

In addition, in the display device 10 according to the first embodiment, the plurality of regions 42a to 42i include the middle region (i.e., the region 42a) positioned in the middle of the bendable portion 42 in the bending direction A, the first end region (i.e., the region 42e) positioned at the first end of the bendable portion 42 in the bending direction A, and the second end region (i.e., the region 42i) positioned at the second end of the bendable portion 42 in the bending direction A, and the opening area ratio of the bendable portion 42 in the first end region and the opening area ratio of the bendable portion 42 in the second end region are smaller than the opening area ratio of the bendable portion 42 in the middle region.

Thus, the opening area ratio of the bendable portion 42 in the first end region and the opening area ratio of the bendable portion 42 in the second end region are smaller than the opening area ratio of the bendable portion 42 in the middle region, and this contributes to preventing each of the first end region and the second end region from being visually recognized through the display panel 20 while keeping it easy for the plate-shaped member 41 to be folded. This, in turn, contributes to preventing the bendable portion 42 of the plate-shaped member 41 from being visually recognized through the display panel 20. In the present embodiment, the opening area ratio in the vicinity of the boundary between the bendable portion 42 and the first flat portion 43 and the opening area ratio in the vicinity of the boundary between the bendable portion 42 and the second flat portion 44 vary more moderately and smoothly, making it difficult for the bendable portion 42 to be visually recognized.

Further, in the display device 10 according to the first embodiment, in the perpendicular direction B perpendicular to the bending direction A, the dimension of each of the plurality of through holes 45e formed in the first end region and the dimension of each of the plurality of through holes 45i formed in the second end region are smaller than the dimension of each of the plurality of through holes 45a formed in the middle region.

This makes it easy to make the opening area ratio of the bendable portion 42 in the first end region and the opening area ratio of the bendable portion 42 in the second end region smaller than the opening area ratio of the bendable portion 42 in the middle region, and this, in turn, contributes to easily preventing the bendable portion 42 of the plate-shaped member 41 from being visually recognized through the display panel 20.

Further, in the display device 10 according to the first embodiment, the plurality of regions 42a to 42i include the one or more regions 42b, 42c, and 42d positioned between the middle region and the first end region and the one or more regions 42f, 42g, and 42h positioned between the middle region and the second end region, and the opening area ratio of the bendable portion 42 in the plurality of regions 42a to 42i decreases from the middle region toward the first end region, and decreases from the middle region toward the second end region.

This contributes to preventing the bendable portion 42 of the plate-shaped member 41 from being visually recognized through the display panel 20 while more effectively keeping it easy for the plate-shaped member 41 to be folded.

Further, in the display device 10 according to the first embodiment, the plurality of through holes formed in each of the plurality of regions 42a to 42i are arranged at least in the perpendicular direction B perpendicular to the bending direction A, and the interval between the through holes formed in one of two adjacent ones of the plurality of regions 42a to 42i and arranged in the perpendicular direction B is different from the interval between the through holes formed in the other one of the two adjacent regions and arranged in the perpendicular direction B.

Accordingly, positions, in the perpendicular direction B, of non-opening portions between pairs of the through holes adjacent to each other in the perpendicular direction B can be made different between two adjacent ones of the plurality of regions 42a to 42i, which contributes to preventing the non-opening portions from being aligned in the bending direction A. Consequently, the bendable portion 42 can be prevented from easily being visually recognized due to the alignment of the non-opening portions in the bending direction A, and the bendable portion 42 of the plate-shaped member 41 can be prevented from being visually recognized through the display panel 20.

Further, in the display device 10 according to the first embodiment, the plurality of through holes formed in each of the plurality of regions 42a to 42i are arranged in a staggered configuration.

Accordingly, the positions, in the perpendicular direction B, of the non-opening portions between pairs of the through holes adjacent to each other in the perpendicular direction B can be made different between two adjacent ones of the plurality of regions 42a to 42i, which contributes to preventing the non-opening portions from being aligned in the bending direction A. Consequently, the bendable portion 42 can be prevented from easily being visually recognized due to the alignment of the non-opening portions in the bending direction A, and the bendable portion 42 of the plate-shaped member 41 can be prevented from being visually recognized through the display panel 20.

Second Embodiment

FIG. 5A and FIG. 5B illustrate a reinforcing member 50 of a display device according to a second embodiment of the present disclosure. Here, FIG. 5B represents an enlarged view of a portion enclosed by a dashed line in FIG. 5A. In FIG. 5A, a boundary between a bendable portion 52 and a first flat portion 43 and a boundary between the bendable portion 52 and a second flat portion 44 are represented by chain double-dashed lines. In addition, in FIG. 5A, a plurality of through holes formed in the bendable portion 52 are not illustrated. The reinforcing member 50 included in the display device according to the second embodiment will be described in detail below with reference to FIG. 5A and FIG. 5B.

As illustrated in FIG. 5A, the reinforcing member 50 includes a plate-shaped member 51. The plate-shaped member 51 is different from the plate-shaped member 41 primarily in including the bendable portion 52, which is different from the bendable portion 42.

The bendable portion 52 includes a region group 52A including a plurality of regions 52a, 52b, and 52c arranged in the bending direction A. Each of the regions 52*a* to 52*c* extends from one end to another end of the bendable portion 52 in the perpendicular direction B.

The regions 52*a* to 52*c* include a middle region positioned in a middle of the bendable portion 52 in the bending direction A, a first end region positioned at a first end of the bendable portion 52 in the bending direction A, and a second end region positioned at a second end of the bendable portion 52 in the bending direction A. In the present embodiment, the region 52*a* corresponds to the middle region, the region 52*b* corresponds to the first end region, and the region 52*c* corresponds to the second end region.

The reinforcing member 50 has a plurality of through holes formed in each of the regions 52*a* to 52*c*. Specifically, the reinforcing member 50 has a plurality of through holes 55*a* formed in the region 52*a*, a plurality of through holes 55*b* formed in the region 52*b*, and a plurality of through holes 55*c* formed in the region 52*c*. The through holes formed in each of the regions 52*a* to 52*c* are formed, for example, through wet etching or other methods.

The opening area ratio of the bendable portion 52 in each of the regions 52*a* to 52*c* is different from the opening area ratio of the bendable portion 52 in an adjacent one(s) of the regions 52*a* to 52*c*. More specifically, for example, the opening area ratio of the bendable portion 52 in the region 52*a* is different from the opening area ratio of the bendable portion 52 in the region 52*b*, which is adjacent to the region 52*a*, and is different from the opening area ratio of the bendable portion 52 in the region 52*c*, which is adjacent to the region 52*a*.

Assuming that the through hole 55*a* positioned in a middle of the bendable portion 52 in the perpendicular direction B has a predetermined dimension in the perpendicular direction B, the through holes 55*a* positioned closer to either end of the bendable portion 52 in the perpendicular direction B have gradually smaller dimensions in the perpendicular direction B. The dimension of each of the through holes 55*b* and the through holes 55*c* in the perpendicular direction B is equal to or smaller than half of the predetermined dimension. In other words, each of the region 52*b* and the region 52*c* is a region having formed therein through holes each having a dimension in the perpendicular direction B equal to or smaller than half of the predetermined dimension.

In each of the regions 52*a* to 52*c*, the through holes have greater dimensions in the perpendicular direction B as the through holes are closer to the middle of the bendable portion 52 in the bending direction A. For example, in the region 52*a*, the through holes 55*a* have greater dimensions in the perpendicular direction B as the through holes 55*a* are closer to the middle of the bendable portion 52 in the bending direction A. In other words, the through holes 55*a* formed in the region 52*a* have greater dimensions in the perpendicular direction B as the through holes 55*a* are formed closer to the middle of the bendable portion 52 in the bending direction A.

The display device according to the second embodiment has been described above.

Third Embodiment

Figure 6A:
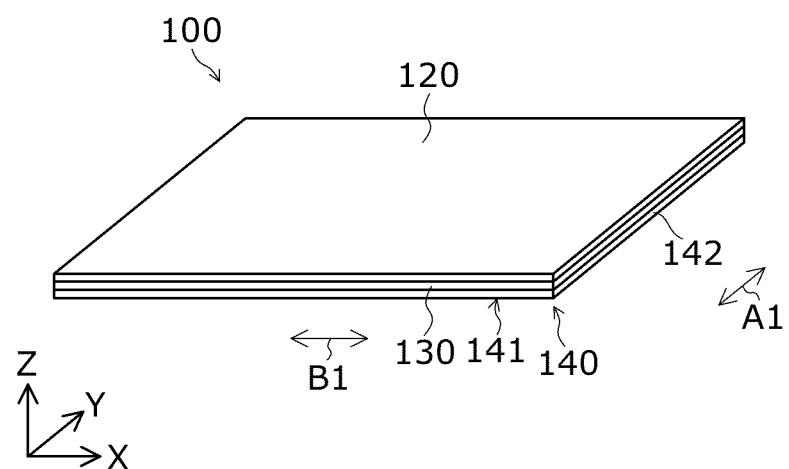
FIG. 6A and FIG. 6B represent perspective views of a display device according to a third embodiment of the present disclosure.
Figure 6B:
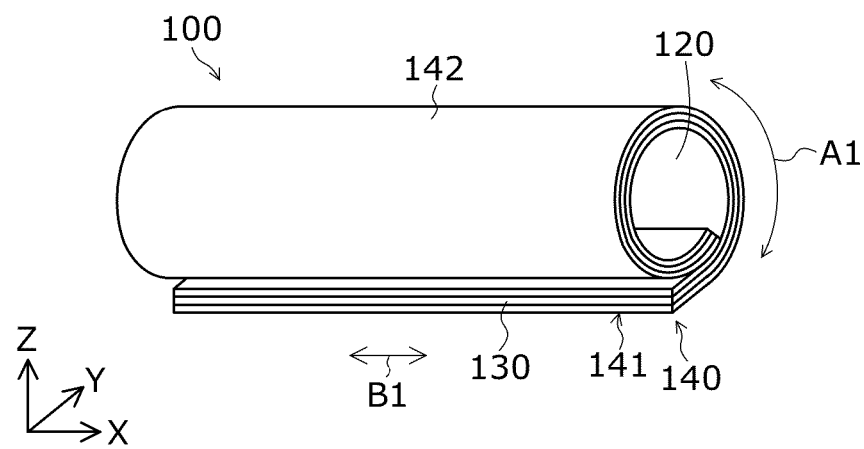
Figure 7:
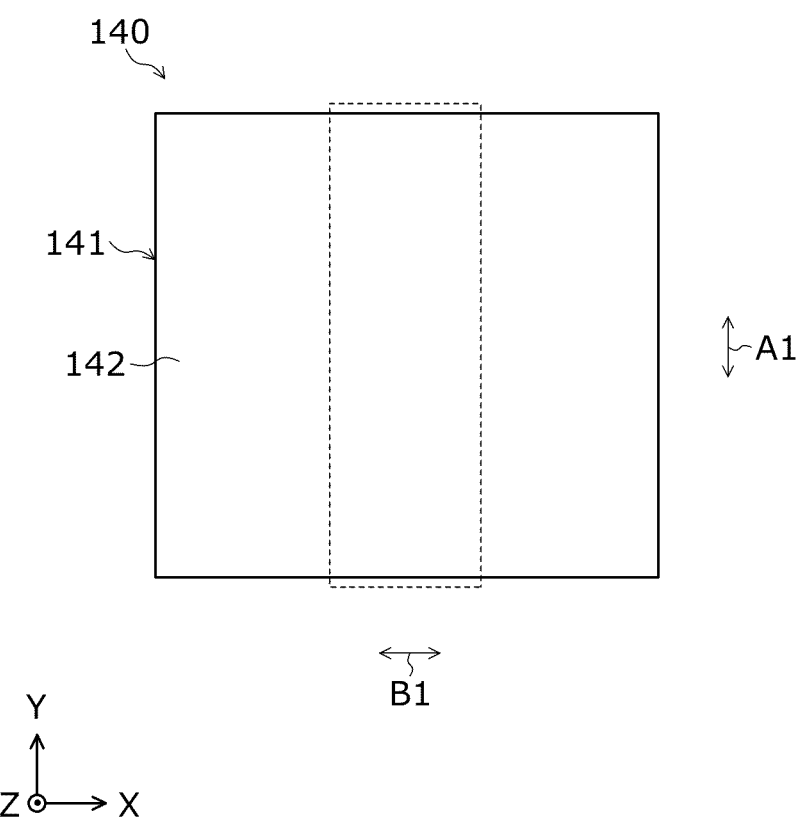
FIG. 7 illustrates a reinforcing member of the display device illustrated in FIG. 6A and FIG. 6B.

FIG. 6A and FIG. 6B represent perspective views of a display device 100 according to a third embodiment of the present disclosure. Here, FIG. 6A illustrates the display device 100 in a state in which a display panel 120 and other components are spread out, while FIG. 6B illustrates the display device 100 in a state in which the display panel 120 and other components have been rolled up. FIG. 7 illustrates a reinforcing member 140 of the display device 100 illustrated in FIG. 6A and FIG. 6B. In FIG. 7, a plurality of through holes formed in a bendable portion 142 are not illustrated. The display device 100 according to the third embodiment will be described below with reference to FIGS. 6A, 6B, and 7.

As illustrated in FIG. 6A and FIG. 6B, the display device 100 is a device that displays an image, and includes the display panel 120, an optical adhesive sheet 130, and the reinforcing member 140. The display device 100 is a rollable display device, and the display panel 120, the optical adhesive sheet 130, and the reinforcing member 140 can be rolled up, while the display panel 120 and other components in a rolled-up state can be spread out. The display device 100 is used in, for example, a tablet terminal, a digital television, digital signage, a smart phone, a wearable terminal, or the other equipment.

The display panel 120 is a display panel capable of being rolled up. The display panel 120 has flexibility, and is what is generally called a flexible display panel. The display panel 120 displays an image. For example, the display panel 120 is connected to a driving board (not illustrated) through a flexible board (not illustrated), and is driven by the driving board to display an image.

The display panel 120 is a plate-shaped member that extends in the first direction and the second direction and has a thickness direction parallel to the third direction in a spread-out state, and displays an image toward one side in the third direction (i.e., the positive side in the z-axis direction). In the spread-out state, the display panel 120 is rectangular when viewed in the third direction. Note that the display panel 120 may not be rectangular but may alternatively be in the shape of another polygon, circular, or elliptical, for example, in the spread-out state.

The display panel 120 is rolled up about the first direction. That is, the display panel 120 is bent about the first direction when in the rolled-up state. In the present embodiment, the display panel 120 is rolled up such that the optical adhesive sheet 130 and the reinforcing member 140 are positioned outward of the display panel 120.

Similarly to the display panel 20, for example, the display panel 120 includes a cover window, an optical adhesive sheet, a circularly polarizing plate, an optical adhesive sheet, and an OLED panel arranged in a stack.

The optical adhesive sheet 130 is stuck to a rear surface of the display panel 120 on a side opposite to a display screen thereof which displays an image, and is thus placed on the display panel 120. In the present embodiment, the optical adhesive sheet 130 is stuck to the whole rear surface of the display panel 120. For example, an acrylic, silicone, epoxy, or rubber adhesive can be used as the optical adhesive sheet 130.

The reinforcing member 140 is a member for reinforcing the display panel 120. The reinforcing member 140 includes a plate-shaped member 141.

The plate-shaped member 141 is a plate-shaped member placed on the display panel 120 and capable of being rolled up together with the display panel 120. The plate-shaped member 141 is placed on a rear side of the display panel 120. The plate-shaped member 141 has higher rigidity than the display panel 120. The plate-shaped member 141 is adhered to the display panel 120 with the optical adhesive sheet 130 intervening therebetween.

The plate-shaped member 141 is a plate-shaped member that extends in the first direction and the second direction and has a thickness direction parallel to the third direction in a spread-out state. In the spread-out state, the plate-shaped member 141 is rectangular when viewed in the third direction. Note that the plate-shaped member 141 may not be rectangular and may alternatively be in the shape of another polygon, circular, or elliptical, for example, in the spread-out state. The plate-shaped member 141 is made of, for example, metal having a large elastic region, such as SUS301, or other materials.

The plate-shaped member 141 includes the bendable portion 142. The bendable portion 142 is a bendable portion that is bent when the plate-shaped member 141 is rolled up together with the display panel 120. The bendable portion 142 is plate-shaped and has a thickness direction parallel to the third direction when the plate-shaped member 141 is in the spread-out state.

A bending direction A1 along which the bendable portion 142 is bent when the plate-shaped member 141 is rolled up together with the display panel 120 is parallel to principal surfaces of the plate-shaped member 141, coincides with the second direction when the plate-shaped member 141 is in the spread-out state, and is bent about the first direction when the plate-shaped member 141, together with the display panel 120, is in a rolled-up state. A perpendicular direction B1, which is perpendicular to the bending direction A1, is parallel to the principal surfaces of the plate-shaped member 141, is perpendicular to the thickness direction of the plate-shaped member 141, and coincides with the first direction.

In the present embodiment, the whole plate-shaped member 141 is bent when the plate-shaped member 141 is rolled up together with the display panel 120. That is, in the present embodiment, the whole plate-shaped member 141 corresponds to the bendable portion 142. Note that the whole plate-shaped member 141 may not necessarily correspond to the bendable portion 142. For example, an end portion of the plate-shaped member 141 at one end in the bending direction A1 and an end portion of the plate-shaped member 141 at an opposite end in the bending direction A1 may not be bent. In this case, a remaining portion of the plate-shaped member 141 between the above two end portions corresponds to the bendable portion 142.

As will be described in detail below, the bendable portion 142 has a plurality of through holes formed therein, and owing to the through holes formed therein, the bendable portion 142 is capable of being bent to such an extent that the plate-shaped member 141 can be rolled up. That is, each of the through holes formed in the bendable portion 142 is a through hole for enabling the plate-shaped member 141 to be rolled up.

Figure 8:
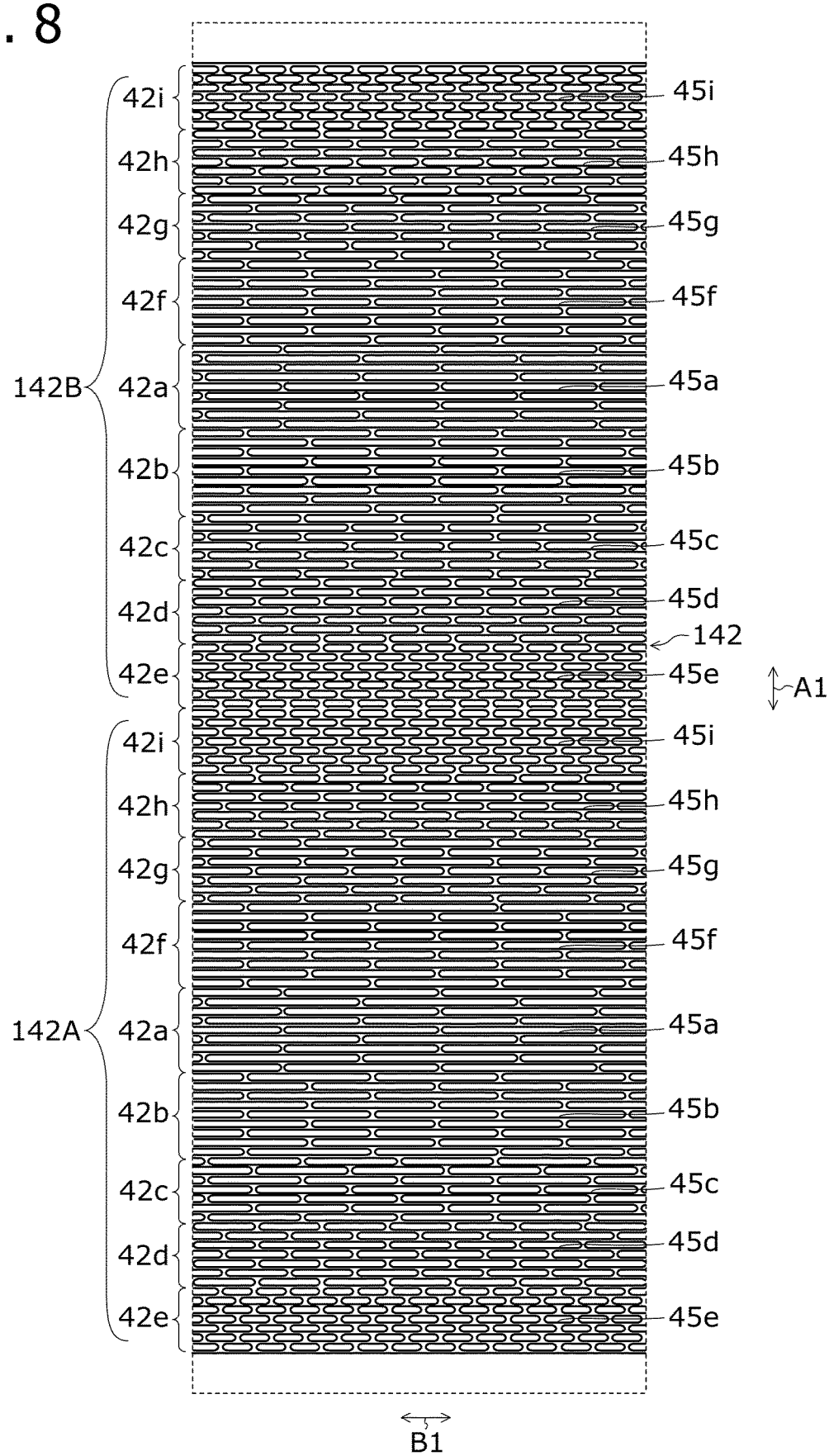
FIG. 8 is an enlarged view of a portion enclosed by a dashed line in FIG. 7.

FIG. 8 is an enlarged view of a portion enclosed by a dashed line in FIG. 7. The reinforcing member 140 will be described in detail below with reference to FIG. 8.

As illustrated in FIG. 8, the bendable portion 142 includes a plurality of region groups 142A and 142B. The region groups 142A and 142B are arranged in the bending direction A1, and are adjacent to each other in the bending direction A1. In the present embodiment, the bendable portion 142 has the region group 142A on one side of a middle of the bendable portion 142 in the bending direction A1, and has the region group 142B on an opposite side of the middle of the bendable portion 142 in the bending direction A1. Each of the region groups 142A and 142B includes a plurality of regions 42a, 42b, 42c, 42d, 42e, 42f, 42g, 42h, and 42i arranged in the bending direction A1. In each of the region groups 142A and 142B, each of the regions 42a to 42i extends from one end to another end of the bendable portion 142 in the perpendicular direction B1.

In each of the region groups 142A and 142B, the regions 42a to 42i include a middle region positioned in a middle of the region group in the bending direction A1, a first end region positioned at a first end of the region group in the bending direction A1, and a second end region positioned at a second end of the region group in the bending direction A1. In the present embodiment, in each of the region groups 142A and 142B, the region 42a corresponds to the middle region, the region 42e corresponds to the first end region, and the region 42i corresponds to the second end region.

In each of the region groups 142A and 142B, the opening area ratio of the bendable portion 142 in each of the regions 42a to 42i is different from the opening area ratio of the bendable portion 142 in an adjacent one(s) of the regions 42a to 42i.

In addition, in each of the region groups 142A and 142B, the opening area ratio of the bendable portion 142 in the first end region and the opening area ratio of the bendable portion 142 in the second end region are smaller than the opening area ratio of the bendable portion 142 in the middle region. That is, in each of the region groups 142A and 142B, the opening area ratio of the bendable portion 142 in the region 42e and the opening area ratio of the bendable portion 142 in the region 42i are smaller than the opening area ratio of the bendable portion 142 in the region 42a.

The display device 100 according to the third embodiment has been described above.

In the display device 100 according to the third embodiment, the bendable portion 142 includes the plurality of region groups 142A and 142B arranged in the bending direction A1. In each of the plurality of region groups 142A and 142B, the plurality of regions 42a to 42i include the middle region (i.e., the region 42a) positioned in the middle of the region group in the bending direction A1, the first end region (i.e., the region 42e) positioned at the first end of the region group in the bending direction A1, and the second end region (i.e., the region 42i) positioned at the second end of the region group in the bending direction A1. In each of the plurality of region groups 142A and 142B, the opening area ratio of the bendable portion 142 in the first end region and the opening area ratio of the bendable portion 142 in the second end region are smaller than the opening area ratio of the bendable portion 142 in the middle region.

Thus, in each of the region groups 142A and 142B, the opening area ratio of the bendable portion 142 in the first end region and the opening area ratio of the bendable portion 142 in the second end region are smaller than the opening area ratio of the bendable portion 142 in the middle region, and this contributes to preventing each of the first end region and the second end region from being visually recognized through the display panel 120 while keeping it easy for the plate-shaped member 141 to be folded. This, in turn, contributes to preventing the bendable portion 142 of the plate-shaped member 141 from being visually recognized through the display panel 120.

Note that the bendable portion 142 may alternatively include a plurality of region groups that are arranged in the bending direction A1 and that each include a plurality of regions 52a, 52b, and 52c, for example.

Also note that the bendable portion 142 may alternatively include a middle region positioned in the middle of the bendable portion 142 in the bending direction A1, a first end region positioned at a first end of the bendable portion 142 in the bending direction A1, and a second end region positioned at a second end of the bendable portion 142 in the bending direction A1, for example. In this case, the opening area ratio of the bendable portion 142 in the first end region and the opening area ratio of the bendable portion 142 in the second end region may be smaller than the opening area ratio of the bendable portion 142 in the middle region.

Also note that the display device 100 may further include a winding device for rolling up the display panel 120 and other components and a drawing device for drawing out the display panel 120 and other components in a rolled-up state, for example. The winding device includes, for example, a spool that is connected to end portions of the display panel 120 and other components on one side and around which the display panel 120 and other components are to be wound and a motor for rotating the spool. Meanwhile, the drawing device includes, for example, a fixed member fixed to end portions of the display panel 120 and other components on an opposite side and a pantograph unit that pushes out the fixed member in a draw-out direction.

Other Embodiments, Etc.

While display devices according to embodiments of the present disclosure have been described above, it will be understood that the present disclosure is not limited to the above-described embodiments. The present disclosure includes modifications of the above-described embodiments which can be obtained by making various modifications conceivable by those skilled in the art to the above-described embodiments without departing from the gist of the present disclosure and various types of devices containing display panels according to embodiments of the present disclosure.

In each of the above-described embodiments, the dimension of each of the through holes formed in the first end region in the perpendicular direction B and the dimension of each of the through holes formed in the second end region in the perpendicular direction B are smaller than the dimension of each of the through holes formed in the middle region in the perpendicular direction B. Note, however, that this is not essential to the present disclosure. For example, the dimension of each of the through holes formed in the first end region in the perpendicular direction B and the dimension of each of the through holes formed in the second end region in the perpendicular direction B may be equal to the dimension of each of the through holes formed in the middle region in the perpendicular direction B. In this case, for example, each of the interval between the through holes formed in the first end region and arranged in the perpendicular direction B and the interval between the through holes formed in the second end region and arranged in the perpendicular direction B may be arranged to be greater than the interval between the through holes formed in the middle region and arranged in the perpendicular direction B, to make each of the opening area ratio of the bendable portion in the first end region and the opening area ratio of the bendable portion in the second end region smaller than the opening area ratio of the bendable portion in the middle region. That is, for example, the dimension in the perpendicular direction of each of the plurality of through holes formed in a first one of two adjacent ones of the plurality of regions may be arranged to be equal to the dimension in the perpendicular direction of each of the plurality of through holes formed in a second one of the two adjacent regions, and, in addition, the interval between the through holes formed in the first region and arranged in the perpendicular direction may be arranged to be different from the interval between the through holes formed in the second region and arranged in the perpendicular direction, to make the opening area ratio of the bendable portion in the first region different from the opening area ratio of the bendable portion in the second region.

Display devices according to embodiments of the present disclosure can be used in digital televisions, digital signage, smart phones, tablet terminals, wearable terminals, or other equipment.

What is claimed is:

1. A display device, comprising:
a display panel capable of being rolled up; and
a plate-shaped member placed on the display panel and capable of being rolled up together with the display panel, wherein
the plate-shaped member includes a bendable portion that is bent when the plate-shaped member is rolled up together with the display panel,
the bendable portion includes:
a first region group on a first side of a middle of the bendable portion in a bending direction along which the bendable portion is bent when the plate-shaped member is rolled up together with the display panel, and
a second region group on a second side of the middle of the bendable portion opposite to the first side in the bending direction,
each of the first region group and the second region group includes a plurality of regions arranged in the bending direction, the bendable portion having openings with each of the plurality of regions having a plurality of through holes formed therein,
the plurality of regions of the first region group include a first middle region positioned in a middle of the first region group in the bending direction, a first end region positioned at a first end of the first region group in the bending direction, and a second end region positioned at a second end of the first region group in the bending direction,
in the first region group, an opening area ratio of the bendable portion in the first end region and an opening area ratio of the bendable portion in the second end region are smaller than an opening area ratio of the bendable portion in the first middle region,
the plurality of regions of the second region group include a second middle region positioned in a middle of the second region group in the bending direction, a third end region positioned at a first end of the second region group in the bending direction, and a fourth end region positioned at a second end of the second region group in the bending direction, and
in the second region group, an opening area ratio of the bendable portion in the third end region and an opening area ratio of the bendable portion in the fourth end region are smaller than an opening area ratio of the bendable portion in the second middle region.

2. The display device according to claim 1, wherein, in a perpendicular direction perpendicular to the bending direction, a dimension of each of the plurality of through holes formed in the first end region and a dimension of each of the plurality of through holes formed in the second end region are smaller than a dimension of each of the plurality of through holes formed in the first middle region.

3. The display device according to claim 1, wherein
the plurality of regions further include one or more regions positioned between the first middle region and the first end region and one or more regions positioned between the first middle region and the second end region, and the opening area ratio of the bendable portion in the plurality of regions decreases from the first middle region toward the first end region, and decreases from the first middle region toward the second end region.

4. The display device according to claim 1, wherein
the plurality of through holes formed in each of the plurality of regions are arranged at least in a perpendicular direction perpendicular to the bending direction, and an interval between the plurality of through holes formed in one of two adjacent regions of the plurality of regions and arranged in the perpendicular direction is different from an interval between the plurality of through holes formed in another one of the two adjacent regions and arranged in the perpendicular direction.

5. The display device according to claim 1, wherein the plurality of through holes formed in each of the plurality of regions are arranged in a staggered configuration.

\* \* \* \* \*